United States Patent [19]
Oliveros

[11] Patent Number: 5,600,314
[45] Date of Patent: Feb. 4, 1997

[54] DATA INPUT DEVICE AND CORRELATIVE ENCODING TECHNIQUE

[76] Inventor: Ernesto V. Oliveros, 1329 Third Ave., Suite 392, Chula Vista, Calif. 91911

[21] Appl. No.: 508,188
[22] Filed: Jul. 27, 1995
[51] Int. Cl.⁶ ............................................. H03K 17/94
[52] U.S. Cl. ........................ 341/26; 341/20; 400/98
[58] Field of Search ......................... 341/22, 20, 26, 341/29; 364/709.12, 189, 419.08; 400/98

[56] References Cited

U.S. PATENT DOCUMENTS

| | | | |
|---|---|---|---|
| 4,215,343 | 7/1980 | Ejiri et al. | 340/711 |
| 4,442,506 | 4/1984 | Endfield | 364/419.08 |
| 4,456,972 | 6/1984 | Lee et al. | 364/419.08 |
| 4,464,070 | 8/1984 | Hanft et al. | 400/98 |
| 4,520,457 | 5/1985 | Hagler et al. | 364/419.08 |
| 4,799,144 | 1/1989 | Parruck et al. | 364/200 |
| 4,891,786 | 1/1990 | Goldwasser | 364/419.08 |
| 4,964,075 | 10/1990 | Shaver et al. | 364/419.08 |
| 5,086,503 | 2/1992 | Chung et al. | 395/700 |
| 5,121,472 | 6/1992 | Danish et al. | 395/275 |
| 5,167,017 | 11/1992 | Sasaki | 395/148 |
| 5,187,797 | 2/1993 | Nielsen et al. | 395/800 |
| 5,283,862 | 2/1994 | Lund | 395/155 |
| 5,305,449 | 4/1994 | Ulenas | 395/500 |
| 5,372,441 | 12/1994 | Louis | 321/22 |
| 5,377,358 | 12/1994 | Nakamura | 395/800 |
| 5,410,333 | 4/1995 | Conway | 341/20 |
| 5,448,240 | 9/1995 | Morito | 341/20 |
| 5,486,823 | 1/1996 | Tsai | 341/20 |

Primary Examiner—Jeffery Hofsass
Assistant Examiner—Albert K. Wong
Attorney, Agent, or Firm—Jones, Tullar & Cooper, P.C.

[57] ABSTRACT

A computer input device, i.e. a keyboard, employs a reduced number of keys for entering words, numbers and commands. A novel and economical data encoding technique is employed which assigns single four bit code words (known as quytes) to the Arabic numerals 0–9, two quytes to the letters of the alphabet, and three or more quytes to various "software key" represented commands. This encoding technique not only decreases memory space requirements, but also increases processing speed. To enable an operator to select virtually any number of software keys, a plurality of additional function keys is provided, and these can be operated in a sequential manner along with the arrow and comma keys to generate a software key comprised of any number of quytes. The end of a software key is signified by the actuation of a letter key. Each software key can be represented by an icon which graphically combines all of the key symbols that are necessary to invoke it. A pair of key stick actuators is also provided on the keyboard, each of which combines the functions of a conventional key and a joy stick.

14 Claims, 3 Drawing Sheets

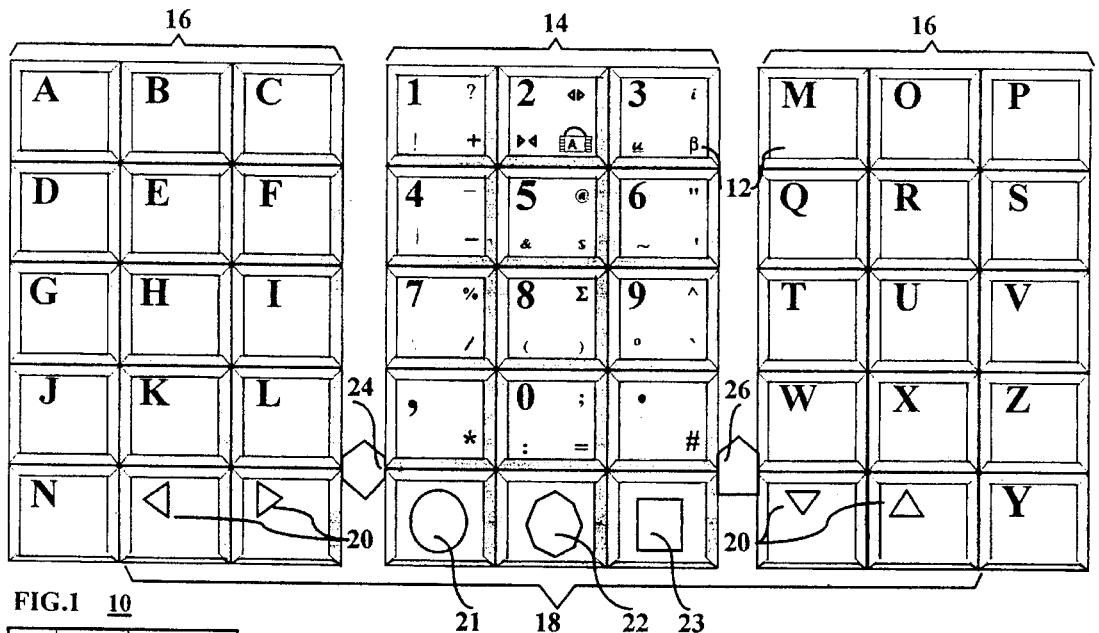
FIG.1
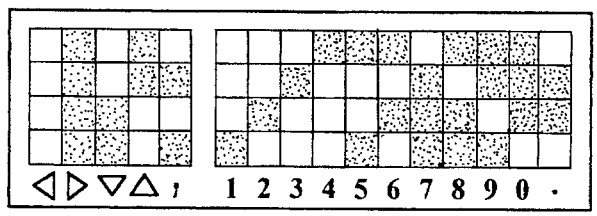
FIG.2
FIG.3
FIG.4

DATA INPUT DEVICE AND CORRELATIVE ENCODING TECHNIQUE

BACKGROUND OF THE INVENTION

The present invention relates in general to a data input device, i.e. a keyboard, and a method for encoding data entered through the keyboard.

Keyboards have been employed for many years as data entry devices for computers and the like. Data encoding techniques have also been employed for many years, with the most popular being The American Standard Code for Information Interchange, otherwise known as ASCII, which was created in 1968 on the basis of a keyboard used on a key-punched card mainframe computer. This code is based on eight bit binary representations of the various characters that can be entered on a conventional keyboard.

In recent years, emphasis has been placed on making computers both smaller and more user friendly. In an effort to make computers portable, vendors have marketed lap top computers which can be stored in a briefcase, and employ conventional keyboards that are smaller than normal. Unfortunately, the smaller keyboards are difficult to operate due to the size of the keys.

Although numerous attempts have been made to alter the number, arrangement and function of the keys on a keyboard, none of these attempts appear to have been commercially successful, and the conventional "QWERTY" keyboard remains the standard in the industry. Similarly, the ASCII code remains the industry standard, in spite of the fact that it is not a particularly efficient code.

SUMMARY OF THE INVENTION

To address the foregoing problems, it is the object of the present invention to provide an improved data input device and associated data encoding technique which combine to provide a device that is considerably easier and more efficient to use than conventional input devices. More particularly, the present invention provides a keyboard type input device which employs a reduced number of keys, a novel key and joy stick arrangement, and a corresponding data encoding technique which permit an operator to select many different functions in an easy and efficient manner.

The keyboard is comprised of 45 keys that are separated into three groups. The first group of 12 keys is centrally located on the keyboard and is assigned to the Arabic numerals 0–9, the period (or decimal point) and the comma. A second group of 26 keys is assigned to the letters of the English alphabet, and this group is separated into two sections on either side of the first group. Finally, a third group of seven keys include four arrow keys, and three keys known as CIRCLE, SQUARE and SHIFT. In addition, two joy stick type input devices known as key sticks are positioned near the bottom of the keyboard for actuation by an operator's thumbs. The key sticks are specially designed so that they can be actuated in a directional manner for browsing, pointing, selecting, scrolling and other functions, and can also be pressed down to provide the conventional CTRL and ALT key functions.

The keyboard is designed to be used with a novel encoding technique that is based on a four bit word length, and provides a more efficient coding method than does the conventional ASCII system. With this technique, numerals are defined by a single four bit digital code word known as a quyte, letters of the alphabet are defined by a pair of four bit code words or quytes, and special symbols and commands are defined by three or more quytes. It is particularly advantageous that the coding assignments for each of the keys are selected so that each of the Arabic numerals 0–9 is represented by one quyte because this enables a computer to process numbers more quickly, and reduces by half the amount of memory storage space required to store the numbers. The four arrows, the period/decimal point and the comma are also each represented by a single quyte. However, the letters of the alphabet, as well as the CIRCLE (insert), SQUARE (delete), SHIFT, CTRL and ALT key symbols, are each defined by two quytes.

Any number of specific computer commands can be defined by three or more quytes through sequential actuation of two or more of the keys. Each of the multiple quyte codes defining these commands begins with a quyte corresponding to one of the four arrow symbols or the comma, and ends with a two quyte code corresponding to a letter of the alphabet. Between them, any combination of quytes corresponding to the four arrow symbols or the comma can be inserted to define a command code of any desired length. Frequently used commands can be graphically represented by "software keys" which provide a convenient means for indicating the identity and sequence of keys necessary to invoke each command through the proper sequential keystroke actuation.

The keyboard can be operated in a number of distinct modes. The first is a conventional typing or editing mode in which an operator actuates the keys for typing words and numbers and editing text. The second mode is a source coding mode in which the operator can form source code for a program simply by entering the appropriate groups of the quytes assigned to each of the keys. A third mode is known as the programming mode in which the operator can write a computer language program by typing sequences of any number of software keys.

BRIEF DESCRIPTION OF THE DRAWINGS

The features and advantages of the present invention will become apparent from the following detailed description of a preferred embodiment thereof, taken in conjunction with the accompanying drawings, in which:

FIG. 1 is a diagrammatic illustration of a keyboard type input device constructed in accordance with a preferred embodiment of the present invention;

FIG. 2 is a chart illustrating the names of a number of the keys on the keyboard of FIG. 1 and their equivalence to a conventional IBM®-PC keyboard;

FIG. 3 is a coding map for each of the keys in a first group of keys on the keyboard of FIG. 1;

FIG. 4 is a coding map for the remaining keys on the keyboard of FIG. 1;

DETAILED DESCRIPTION OF THE PREFERRED EMBODIMENTS

Figure 5:
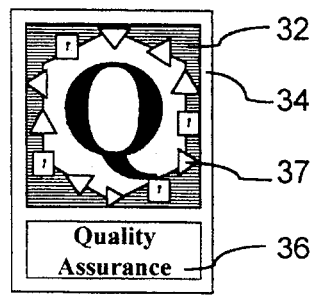
FIG. 5 is a diagrammatic illustration of a software key representing a computer language command that can be selected through sequential actuation of a number of keys on the keyboard.

Turning now to a detailed consideration of a preferred embodiment of the present invention, FIG. 1 illustrates a portable keyboard input device 10 which is comprised of a group of 45 conventional keys 12. The keys 12 are separated into three distinct groups. A first group 14 of 12 keys is centrally located on the keyboard, and includes keys for the 10 Arabic numerals 0–9, the comma and the period/decimal point. A second group of keys illustrated at 16 is assigned to the 26 letters of the alphabet. This group of keys is actually separated into left and right sections which are disposed on either side of the number key group 14 to provide a comfortable spacing for an operator's left and right hands. Finally, a third group 18 of seven keys, known as polygon keys, is located along the bottom row of the keyboard 10, and is comprised of four arrow keys 20, a CIRCLE key 21 (also used as "insert" key in a text/editing mode), a SHIFT key 22, and a SQUARE key 23 (also used as the "delete" key in a text/editing mode).

The input device 10 also includes two joy stick type actuators 24 and 26, known as key sticks, which are positioned at a suitable location near the bottom of the keyboard 10 so that each of them can be easily actuated by a corresponding one of an operator's thumbs. The key sticks 24 and 26 are so named because, as will be discussed in greater detail below in conjunction with FIG. 9, they can be used both as conventional keys, as well as directional actuators. When employed as conventional keys, the two key sticks 24 and 26 provide the CTRL and ALT functions, respectively. The provision of two directional type actuators is particularly advantageous because they enable an operator to perform two operations simultaneously, such as browsing and pointing for example.

The 45 key keyboard 10 is designed with economy, portability and ease of use in mind, and uses a reduced number of keys to minimize the overall size of the keyboard, without minimizing the size of the individual keys. FIG. 2 is a chart illustrating the names and functions of the various polygon keys 18 and the key sticks 24 and 26. It should be noted that although the keyboard 10 only has 45 keys, it can be employed to select any of the functions carried out by conventional IBM®-PC keyboard.

FIG. 3 is a coding map for each of the keys in the first group 14, including the 10 Arabic numeral keys, the comma and period/decimal point keys, and also for each of the four arrow keys 20. As illustrated, each of these 16 keys is identified by a unique four bit binary code word 27 known as a "quyte". FIG. 3 illustrates the quyte coding system for the 16 keys as a graphic representation in which each bit of each quyte is depicted either by a filled (shaded) box which represents a binary 1, or an empty (unshaded) box which represents a binary 0. As illustrated, each quyte 27 is represented by four squares 28 arranged in a vertical stack from bottom to top. The numeral, character or function corresponding to each of the quytes 27 is printed below the corresponding quyte code representation. The use of single quytes for each of the numeral keys and the decimal point is particularly advantageous and economical because numbers can be represented by half the number of binary digits required in the conventional ASCII code, thus reducing memory storage space and processor execution time. As in a conventional keyboard, each of the keys in the number group 14 can also generate other symbols, such as + and − signs, by pressing either the SHIFT key, or either of the CTRL or ALT key sticks 24 and 26.

FIG. 4 illustrates a coding map for the keys in the letter group 16, as well as the CIRCLE, SHIFT, SQUARE, CTRL and ALT key symbols. Each of the letters is represented by two quytes, the first of which is either an arrow or comma quyte, and the second of which is one of the quytes corresponding to the numerals 0–9 or the period/decimal point. It should be noted that in the source coding mode of operation, an operator can enter the two quytes corresponding to a letter code either by depressing the corresponding letter key, or by depressing the two corresponding single quyte keys. For example, the upper case letter "A" is represented by the "right arrow" followed by the number "1", while a lower case "a" is represented by the "left arrow" followed by the number "1". FIG. 4 also indicates that the CIRCLE, SHIFT, SQUARE, CTRL and ALT key symbols illustrated on the right column are each also represented by two quytes. The first quyte corresponds to one of the arrow symbols or the comma, while the second corresponds to the up arrow symbol.

FIG. 5 illustrates an example "software key" 30. It represents a computer language command which can be formed and later invoked through sequential actuation of a plurality of the keys 12 of the keyboard 10. The software key 30 is comprised of an icon known as a cypher 32 and a cypher base 34 that employs colors and patterns to differentiate among different software keys for invoking computer commands and programs, or retrieving documents, for example. The software key 30 also may have a speech recognition invoking code 36 associated therewith which enables an operator to invoke the corresponding command simply by speaking the words of the recognition code 36.

The cypher 32 is formed from an arrangement of the various key symbols whose quytes are employed to form the multiple quyte code word for the corresponding computer language command. In the example shown in FIG. 5, the first key symbol is the hexagon representing the CTRL function which, as illustrated in FIG. 4, is formed by pressing the left arrow and the up arrow keys in sequence. Alternatively, the CTRL symbol can also be invoked by pressing the CTRL key stick 24. Returning again to FIG. 5, the hexagon symbol frames the last symbol of the command, which in this case is the letter Q. Q corresponds to the keystroke sequence performed by the down arrow and the numeral 4.

Figure 6:
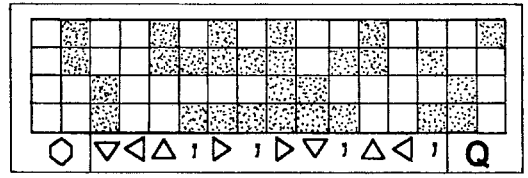
FIG. 6 is a coding map for the computer language command represented by the software key of FIG. 5.

Positioned around the periphery of the hexagon symbol representing the CTRL command is a sequence of 12 of the arrow and comma key symbols 37. Starting at the top, and moving clockwise, these symbols 37 represent the keys that must be pressed in sequence between the entering of the CTRL code and the entering of the Q code. The resulting quyte coding for the example shown in FIG. 5 is illustrated in FIG. 6. The command code for the software key 30 therefor begins with a quyte corresponding to one of the arrow symbols or the comma, in this example the left arrow, and ends with a two quyte code corresponding to one of the letters, in this example Q. It should be noted, that the last quyte of the command always corresponds to one of the Arabic numerals 0–9 or the period/decimal point since each letter ends with one of these quytes.

The representation of the software key 30 in the foregoing manner provides a very economical and convenient way in which to represent a computer language command because it only occupies the space needed for representing one character. In addition, many commonly used programming commands can be implemented using this system with considerably fewer bits than those required using the conventional ASCII code. For example, the well known command "GOTO" is represented by 32 bits (four characters times eight bits per character) in the conventional ASCII code, but with the quyte coding technique, it can be represented by as few as 12 bits (e.g., one quite for the one of the arrow symbols followed by two quytes for the letter G).

The keyboard 10 can be operated in various modes. An editing/typing mode, which is selected by the operator by simply pressing the shift, right-arrow and "E" keys in sequence, causes the keyboard 10 to be operated in a conventional manner for generating text and numbers, and for editing the same. In a programming mode, which is invoked by pressing the shift, right-arrow and "P" keys in sequence, the keyboard 10 can be utilized by the operator for typing "software keys" in accordance with the foregoing discussion regarding FIGS. 5 and 6. Finally, in a source coding mode, which can be invoked by pressing the SHIFT, right-arrow and "S" keys in sequence, the keyboard 10 is utilized by the operator for entering source code directly into the memory by pressing the appropriate keys for generating a sequence of quytes which are sequentially stacked by the decoder program.

Figure 7:
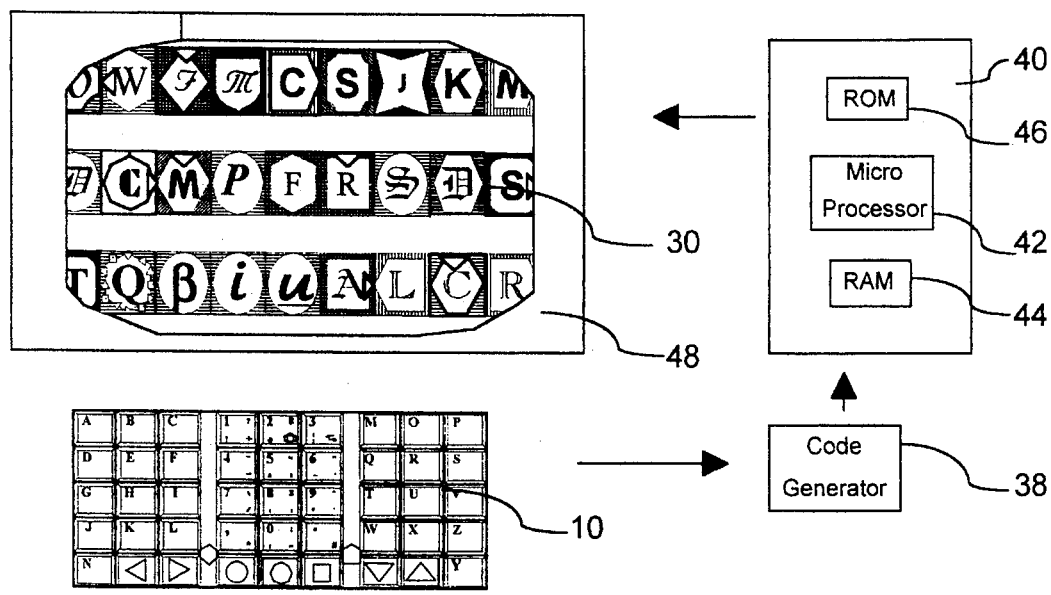
FIG. 7 is a block diagram of a computer system employing the keyboard input device of FIG. 1.

Turning now to FIG. 7, a software or hardware based code generator 38 is formed integrally with the keyboard 10 which generates the quytes each time one of the keys 12 is pressed. It should be understood that the code generator 38 differs from a conventional ASCII based device only in the four bit encoding scheme as discussed previously in conjunction with FIGS. 3 and 4. The keyboard 10 is connected to a conventional computer system 40 containing a microprocessor 42, a RAM 44 and a ROM 46. As is also conventional, a video display or monitor 48 is also connected to the computer system 40 (a plurality of the software keys 30 are displayed on the monitor 48). A decoder program is stored in the RAM 44 and is executed by the microprocessor 42 which stacks and processes the incoming quytes received from the keyboard code generator 38.

Figure 8:
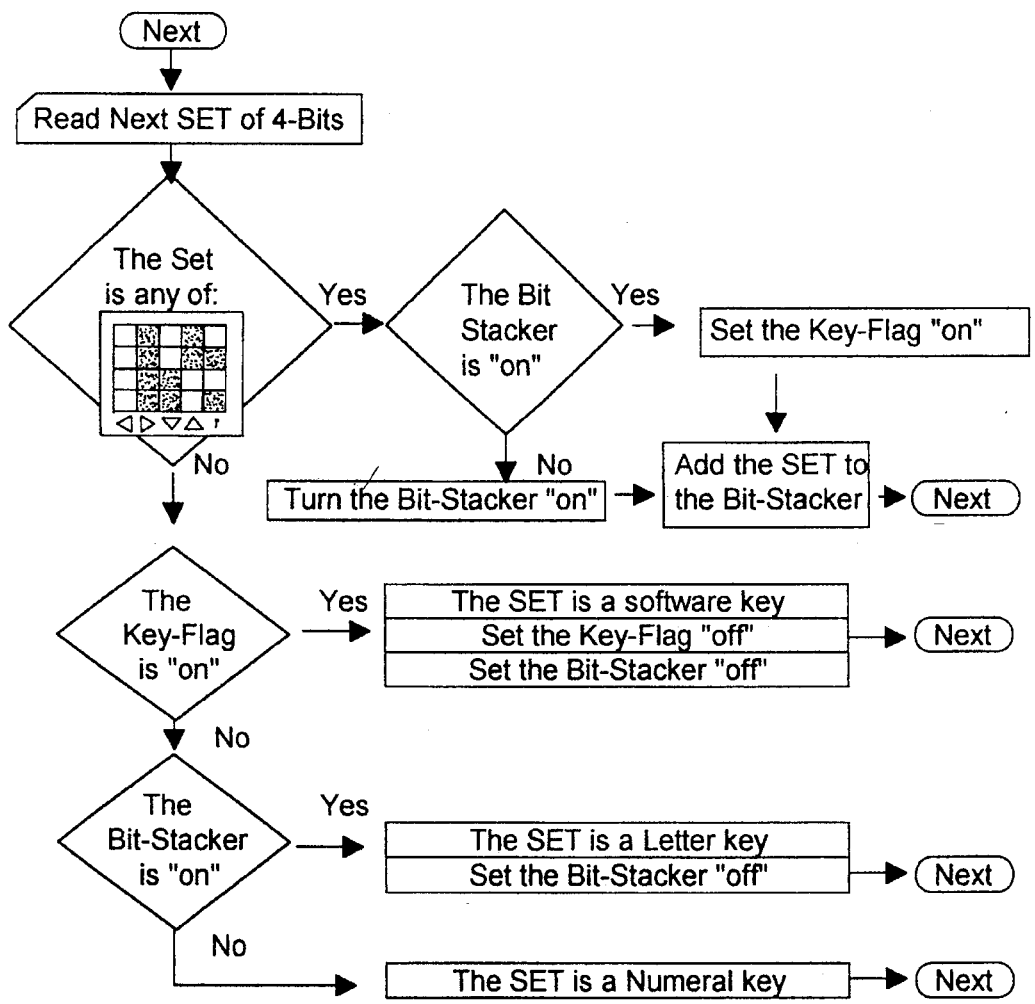
FIG. 8 is a flow chart illustrating the operation of a decoder program for use with the encoding technique that is employed with the preferred embodiment of the present invention; and
}

The flow chart illustrated in FIG. 8 shows how the decoder program functions when the keyboard operator has invoked either the source coding or programming mode of operation. Each time the operator depresses one of the keys 12 of the keyboard 10, one or two quytes are generated by the code generator 38, and transmitted to the microprocessor 32. The decoder program distinguishes between a one quyte numeral code and a two quyte letter code. In addition, the decoder program employs a macro key flag and a bit stacker flag to differentiate between numbers, letters and multiple quyte "software key" codes.

Figure 9:
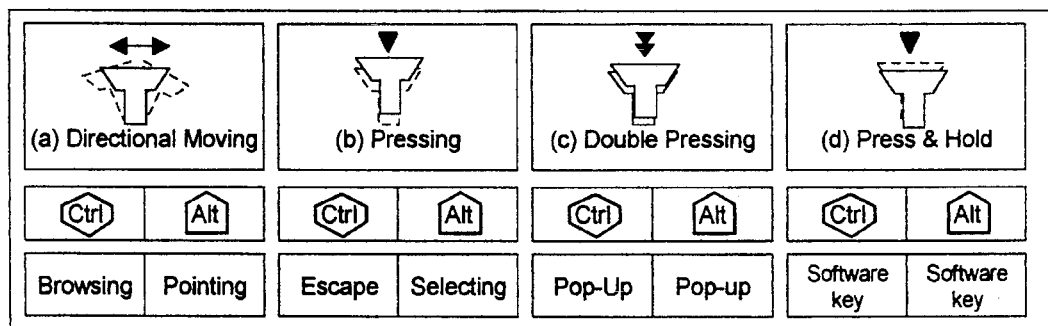
FIG. 9 is a table illustrating the operations that can be carried out by the key stick devices of the preferred embodiment.

The operation of the CTRL and ALT key sticks 24 and 26 is illustrated in FIG. 9. The four possible input modes are labelled (a)–(d), and include directional moving, pressing, double pressing and press and hold. In an editing and typing mode, the four modes of the CTRL key stick 24 correspond to browsing, escape, pop-up menu displaying and software key invoking. The same modes for the ALT key stick 26 correspond to pointing, selecting, pop-up menu displaying and software key invoking. These functional assignments are made to provide the operator with the most convenient operation. For example, the operator can browse a document with directional moving of the CTRL key stick 24, and at the same time, point to a particular part of the document with directional moving of the ALT key stick 26. This greatly simplifies the browsing function which, in conventional operating systems, is normally implemented using multiple point and click operations on bi-directional scrolling bars.

The key sticks 24 and 26 can also be employed in a game mode in which they are used in much the same manner as conventional joy sticks, however, also include the ability to hit, throw, shoot, etc. by pressing down on them. The key sticks 24 and 26 are advantageous in this regard since they do not need to be made much larger physically than the rest of the keys on the keyboard 10, and thereby assist in minimizing the overall size of the keyboard 10.

In summary, the present invention provides a keyboard type input device and encoding technique therefore which provides numerous advantages over conventional input devices and encoding techniques. The overall arrangement of the keys and the key sticks results in a device which can be made easily portable, without sacrificing individual key size, while the quyte based data encoding technique provides a versatile scheme which can increase processing speed and decrease memory space requirements. The invention also provides a convenient technique for graphically displaying, encoding and invoking computer language commands through software keys which is economical, easy to use and easy to remember.

Although the present invention has been disclosed in terms of a preferred embodiment, it will be understood that numerous other modifications and variations could be made thereto without departing from the scope of the invention as defined in the following claims.

What is claimed is:

1. A data input device comprising:

A key board containing a plurality of keys including a first group of 26 keys assigned to each letter of the alphabet and a second group of keys assigned to each Arabic numeral; and a code generator for generating a plurality of four bit code words in response to actuation of said keys, one four bit code word for each of second group of keys, and two four bit code words for each of said first group of keys.

2. The data input device of claim 1, further comprising first and second key stick actuating devices positioned adjacent a bottom portion of said keyboard in a manner so that they can each be simultaneously actuated by a respective one of an operator's thumbs, each of said key stick actuating devices including a directional actuator element which can also be pressed to act as a conventional key actuator.

3. The data input device of claim 2, wherein said first key stick actuating device provides a browsing function, and said second key stick actuating device provides a pointing function.

4. The data input device of claim 1, wherein said first group of 26 keys is separated into first and second sections disposed on opposite sides of said second group of keys.

5. The data input device of claim 1, wherein said second group of keys further includes a period/decimal point key and a comma key.

6. The data input device of claim 1, further comprising a third group of keys for entering special functions.

7. The data input device of claim 6, wherein said third group of keys is positioned along a bottom row of said keyboard and consists of seven keys.

8. The data input device of claim 7, wherein said third group of keys correspond to four arrow keys and three command keys.

9. The data input device of claim 8, wherein said code generator generates a four bit code word in response to actuation of one of said four arrow keys, and two four bit code words in response to actuation of one of said command keys.

10. The data input device of claim 1, wherein said first group of 26 keys assigned to each letter of the alphabet are arranged so that the keys are positioned in alphabetical order.

11. A method for encoding digital data for entry into a computer comprising the steps of:

a) providing a keyboard data entry device, said keyboard including a first group of keys corresponding to Arabic numerals, and a second group of keys corresponding to the letters of the alphabet;

b) providing a code generator connected to said keyboard for generating binary code words in response to actuation of the keys on said keyboard, said code generator generating a first plurality of four bit binary code words, one for each of said number keys, and generating a second plurality of pairs of four bit code words, one pair for each of said letter keys.

12. The method of claim 11, further comprising the steps of:

(c) providing a third group of command keys on said keyboard for encoding computer commands, each of said keys in said third group being assigned to a different four bit code word; and (d) sequentially actuating a combination of said command keys to generate a variable length command code comprised of at least three four bit code words corresponding to said command keys, and terminating said command code by actuating one of said letter keys to generate a pair of four bit code words which signify the end of said command code.

13. The method of claim 12, further comprising the step of providing a graphical representation of a computer command, said graphical representation illustrating the sequence of keys on the keyboard which must be actuated to generate said command code.

14. The method of claim 13, wherein said step of providing a graphical represintation further comprises providing an icon representation of said computer command, said icon representation including a large geometric symbol surrounding a letter of the alphabet, and a plurality of small symblos spaced around said letter, said geometric symbol indicating the first key to be pressed to invoke said command, the plurality of small symbols indicating a sequence of intermediate keys to be pressed to invoke the commeand, and the letter indicating the last key to be pressed to invoke said command.

* * * * *